(12) United States Patent
Wilson

(10) Patent No.: US 10,254,569 B2
(45) Date of Patent: Apr. 9, 2019

(54) EYEWEAR LENS SHIELD FOR LENS PROTECTION DURING REPAIR

(71) Applicant: Marlon Wilson, Burnsville, MN (US)

(72) Inventor: Marlon Wilson, Burnsville, MN (US)

( * ) Notice: Subject to any disclaimer, the term of this patent is extended or adjusted under 35 U.S.C. 154(b) by 0 days.

(21) Appl. No.: 15/593,204

(22) Filed: May 11, 2017

(65) Prior Publication Data
US 2017/0343836 A1   Nov. 30, 2017

Related U.S. Application Data

(60) Provisional application No. 62/342,476, filed on May 27, 2016.

(51) Int. Cl.
*G02C 13/00* (2006.01)
*F16M 11/04* (2006.01)
*F16B 1/00* (2006.01)

(52) U.S. Cl.
CPC ......... *G02C 13/001* (2013.01); *F16M 11/041* (2013.01); *F16B 2001/0028* (2013.01); *F16M 2200/08* (2013.01)

(58) Field of Classification Search
CPC .... G02C 13/001; G02C 13/00; G02C 13/006; F16B 1/00; F16B 2001/0028; F16M 11/041; F16M 2200/08
See application file for complete search history.

(56) References Cited

U.S. PATENT DOCUMENTS

| 2,440,552 A | * | 4/1948 | Mittell | A45C 11/04 206/5 |
| 2,461,792 A | * | 2/1949 | Weaver | A45C 11/04 206/6 |
| 2,723,745 A | * | 11/1955 | McNeill | A45C 11/04 206/5 |
| 3,116,829 A | * | 1/1964 | Pacelli | B65D 75/36 206/459.5 |
| 3,148,812 A | * | 9/1964 | Hilsinger, Jr. | A45F 5/02 206/5 |
| 3,977,516 A | * | 8/1976 | Tilve | A45C 11/04 206/5 |
| 4,119,249 A | * | 10/1978 | Hanson | A45C 11/00 224/236 |
| 4,290,522 A | * | 9/1981 | Takasaki | A45C 11/04 206/233 |
| 4,715,575 A | * | 12/1987 | Kamerer | A45C 11/04 211/85.1 |
| 5,032,019 A | * | 7/1991 | Burchett | A45C 11/04 206/5 |
| 5,056,668 A | * | 10/1991 | Berger | A47F 7/021 211/85.1 |
| 5,100,006 A | * | 3/1992 | Forrester | A47F 7/021 211/85.1 |
| 5,104,076 A | * | 4/1992 | Goodall, Jr. | A45F 5/02 224/251 |
| 5,174,483 A | * | 12/1992 | Moore, IV | A45F 5/02 224/250 |
| 5,344,002 A | * | 9/1994 | Baczkowski | A45C 11/043 15/214 |

(Continued)

*Primary Examiner* — Nkeisha Smith
(74) *Attorney, Agent, or Firm* — Hassan Sahouani

(57) ABSTRACT

The invention describes a lens shield having a principal panel and subpanels using hook and loop for closures as well as exhibiting pockets for cooling devices, to keep lenses cool during heating by the optician, and a base to stabilize it on a surface.

6 Claims, 9 Drawing Sheets

(56) References Cited

U.S. PATENT DOCUMENTS

| | | | | |
|---|---|---|---|---|
| 5,363,532 | A | | 11/1994 | Sargent |
| 5,387,950 | A | * | 2/1995 | Weltmann ................ G02C 1/06 2/441 |
| 5,617,153 | A | | 4/1997 | Allen et al. |
| 5,964,386 | A | * | 10/1999 | Cote ......................... A45F 5/02 224/236 |
| 5,979,849 | A | | 11/1999 | Williams |
| 6,330,962 | B1 | * | 12/2001 | Rodriguez ............... G02C 3/04 224/246 |
| 6,546,599 | B2 | * | 4/2003 | Pelt ........................ A45F 5/022 224/222 |
| 6,772,878 | B1 | * | 8/2004 | Liebers .................. A45C 11/04 206/458 |
| 7,762,511 | B1 | * | 7/2010 | Liebers ................ A47F 5/0006 206/5 |
| 7,770,721 | B2 | * | 8/2010 | Orner ..................... A45C 11/04 150/154 |
| D646,481 | S | * | 10/2011 | Taylor .................... A45C 11/04 D3/266 |
| 8,789,689 | B1 | * | 7/2014 | Wong .................. A45C 7/0036 206/6 |
| 9,066,567 | B2 | * | 6/2015 | Rouzeau ............. A45C 11/043 |
| 9,210,991 | B2 | * | 12/2015 | Nishi .................... F28D 20/02 |
| 2009/0000964 | A1 | * | 1/2009 | Orner ..................... A45C 11/04 206/5 |
| 2012/0292205 | A1 | * | 11/2012 | Waters ................... A45C 11/04 206/216 |
| 2015/0071978 | A1 | * | 3/2015 | Chang ..................... A61N 2/06 424/402 |
| 2015/0200554 | A1 | * | 7/2015 | Marks ................... H02J 7/0044 320/108 |
| 2016/0167833 | A1 | * | 6/2016 | de Cordova ........... B65D 29/00 383/105 |

* cited by examiner

EYEWEAR LENS SHIELD FOR LENS PROTECTION DURING REPAIR

CROSS-REFERENCES TO RELATED APPLICATIONS

This application claims benefit under 35 U.S.C § 119(e), to U.S. Patent Provisional Application No. 62/342,476, filed on May 27, 2016 the disclosure of which is herein incorporated by reference in its entirety.

STATEMENT REGARDING FEDERALLY SPONSORED RESEARCH OR DEVELOPMENT

No government funds were used in this invention.

BACKGROUND OF THE INVENTION

Field of the Invention

This invention relates to a reusable lens shield that protects the lenses of the eyeglasses, alternatively called eyewear, during repair and adjustments made by the optician or optical laboratory technician. Oftentimes, when a customer requires adjustments to their eye glasses the optician removes the lenses by exerting pressure on them to force them out of the frame in order to work on the nose bridge separately.

Heat is generally known to be a key factor of crazing of lenses that destroys their optical quality.

An optician or laboratory technician may need to adjust and add face form to a lens to prevent the frame from slipping down a patient's face. In these situations the optician will have to use heat on the bridge of the eye glasses frame in order to adjust and manipulate its shape. It is necessary to remove the lens before this process. However, if the lens is too big to be manually removed from the frame, the optician will have to take the risk of heating the frame with the lenses still in it. Under these circumstances, the lens may be exposed in the heat for too long leading to crazing and the destruction of the lenses. The lens shield will help prevent this or minimize the impact of these accidents.

The materials used in the invention are flexible and heat resistant and easily go over the frame. The lens shield protects the lens while keeping the bridge exposed for direct heat and further adjustment. This is generally done because the adjustments require use of heat to soften the frames in order to bend them. The repeated removal of the lenses predisposes both the lenses and the frames to damage. There is therefore need for a practical shield that can protect the lenses, in place in the frames, from heat and mechanical damage during repairs and adjustments without the need of removing them from the frames.

Description of Related Art

Eyeglasses protectors are well known in the art, and typically take various forms and are used for different purposes. The most commonly used is a thin film such as the one described in U.S. Pat. No. 5,617,153. The film in this case is a thin material designed particularly for the protection against scratching but offers no protection against heat. U.S. Pat. No. 5,979,849 describes an eyewear holder used to secure glasses during repair but does not describe any protective mechanism against heat used to adjust frames of modern plastic eye glasses. The prior art such, as U.S. Pat. No. 5,363,532, also discloses methods and articles for cleaning eyeglasses in which a holding device is provided with a clamping mechanism for mounting eyeglasses in the holding device in a manner which provides clear access to the lens surfaces of the eyeglasses but provides no mechanism for protection against heat damage that can occur when the frames are heated in order to adjust them. There is therefore need for an eye glasses shield or dual purpose eye glasses holder/shield suitable for protection against heat and other damages during repair and adjustments.

SUMMARY OF THE INVENTION

The present invention provides a lens shield with the ability to protect the eyewear lenses from damage due to scratching and heat during repair and adjustments. The present invention does this by providing a lens shield or lens shields made of heat resistant materials having, in some instances, side pockets that allow for insertion of small ice packs or other cooling devices in order to provide further protection of the lenses from heat. In other instances a base to stabilize the invention on a surface is provided. These together With other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

Note: Pockets for cooling devices have been omitted from all the drawings, except FIG. 6 to avoid encumbrance. Therefore all drawings should be assumed to have insertion pockets as described in the description.

DETAILED DESCRIPTION OF THE INVENTION

Glossary

Figure 1:
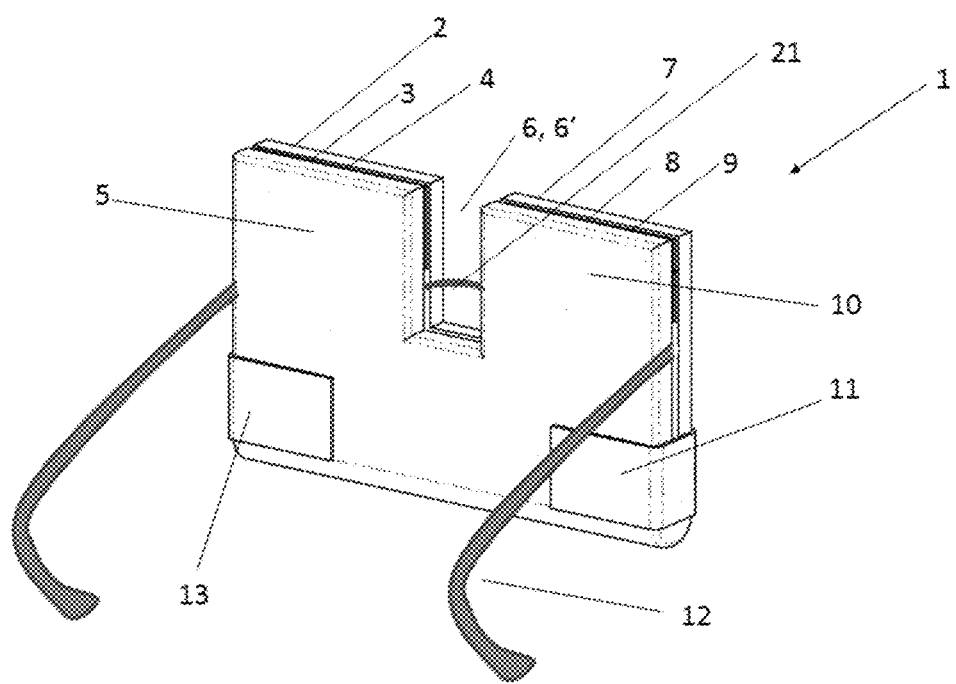
FIG. 1 is a back perspective view of the invention in a closed position holding a pair of eye glasses with the eyeglass bridge being exposed.

Glasses: eye wear consisting of a frame having two eye wires, each having a temple piece, said eye wires each holding a lens. The two eye wires are joined by a nose bridge.

Hook and loop: a closure material such as the one known in the art as VELCRO®.

Front: this refers to the side facing a viewer looking at the pair of glasses as if they were worn by a person.

Back: refers to the opposite side of the front.

When referring to the drawings in detail, like elements are indicated by like numerals in all the drawings.

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein. As will be described in detail below, the present invention provides for and discloses a flexible lens shield assembly comprising a novel design with a plurality of features that permit the user to easily insert and immobilize the eye glasses in place before heating and adjusting them. The lens shield according to the present invention may be provided as an individual unit or as part of an assembly comprising other equipment used by the optician or optical laboratory technician. It should be understood by one skilled in the art that the novel lens shield of the present invention may be embodied in various types of apparatuses commonly used in the art.

Note: Pockets for cooling devices have been omitted from all the drawings, except FIG. 6 to avoid encumbrance. Therefore all drawings should be assumed to have insertion pockets as described in the description.

Figure 4:
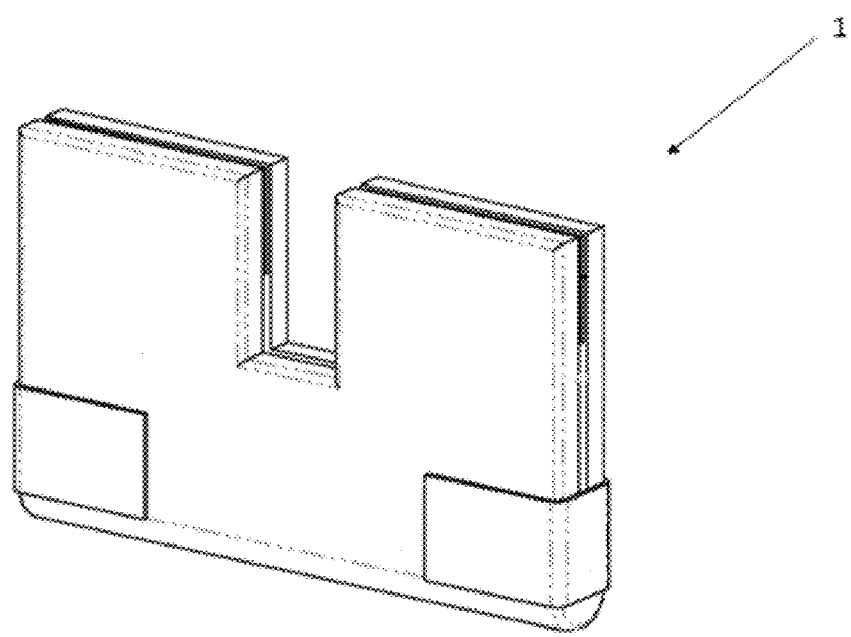
FIG. 4 is a perspective view of the invention viewed from the back depicting the lens shield in a closed position without glasses.
Figure 5:
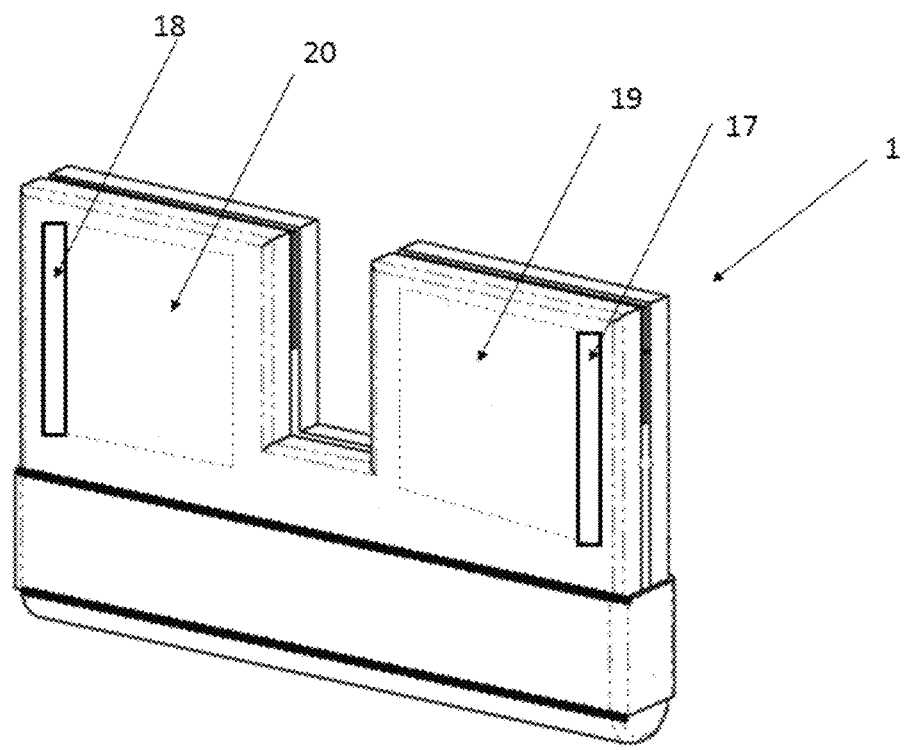
FIG. 5 is a perspective view of the invention viewed from the front depicting the lens shield with pockets for ice packets and insertion slots.
Figure 6:
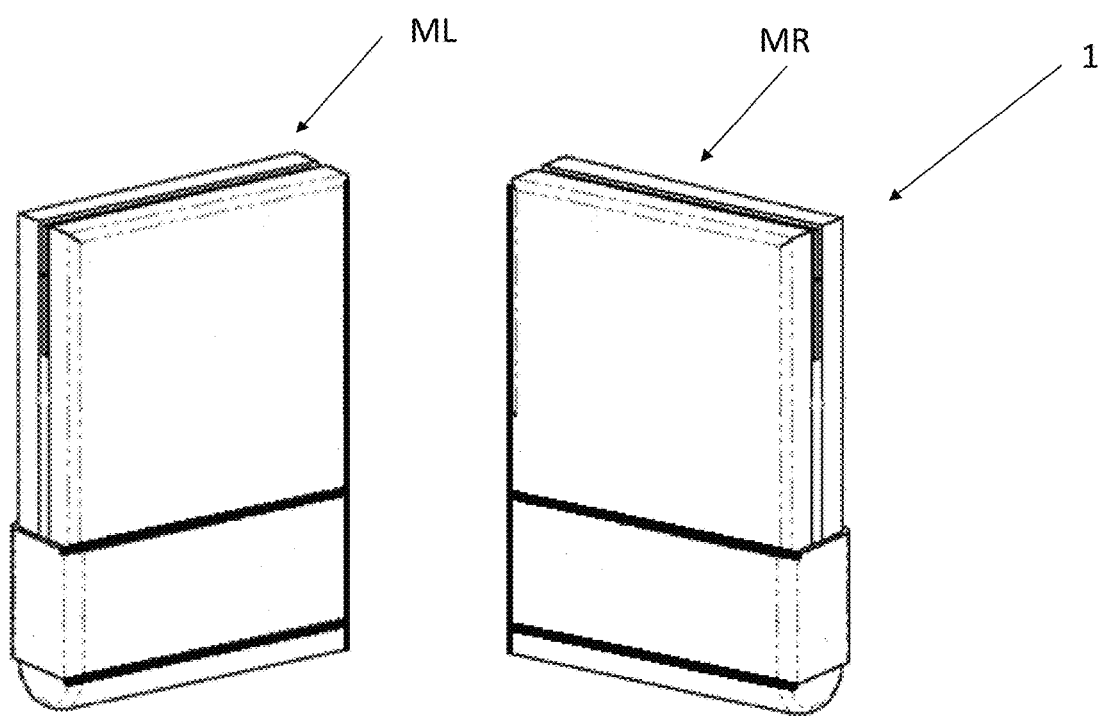
FIG. 6 is a perspective view of the invention viewed from the front depicting the lens shield as a two part construction.
Figure 7:
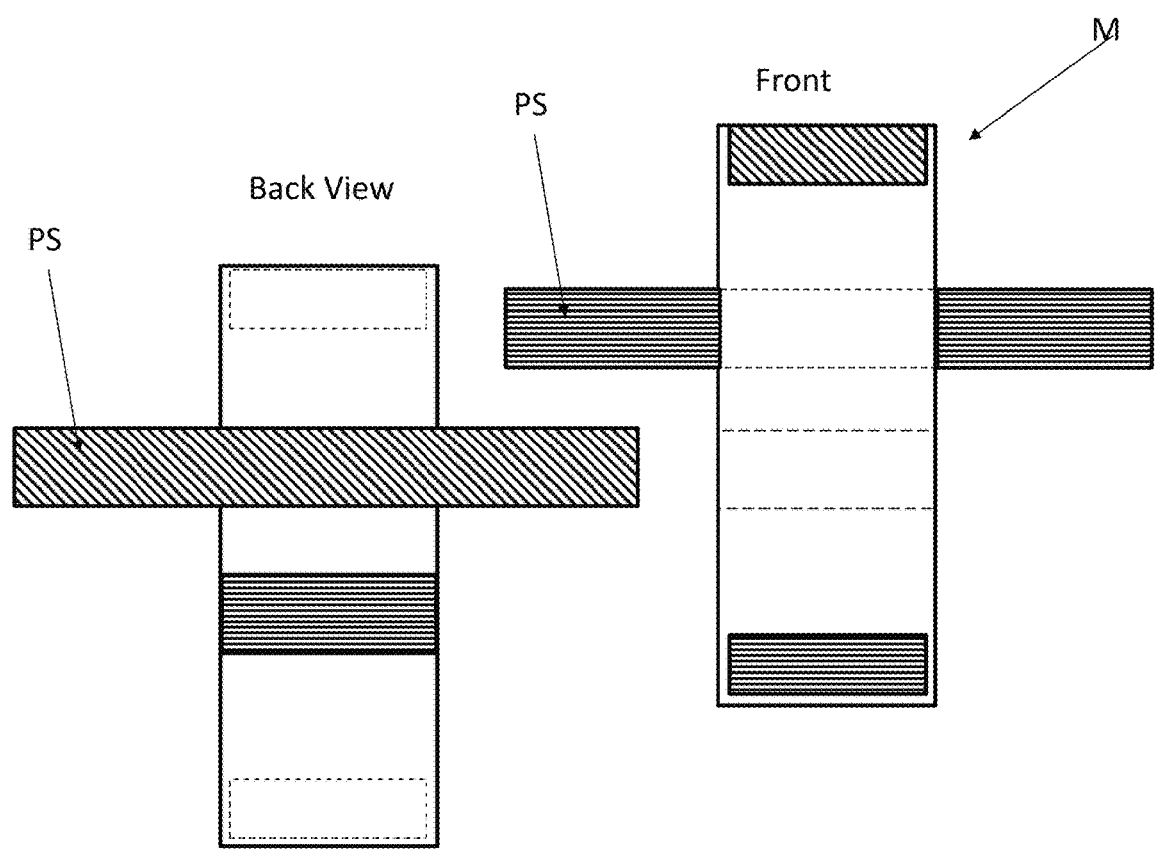
FIG. 7 is a plane view of one of the modules of a two module lens shield omitting the pockets for insertion of the ice packs or cooling device.
Figure 8:
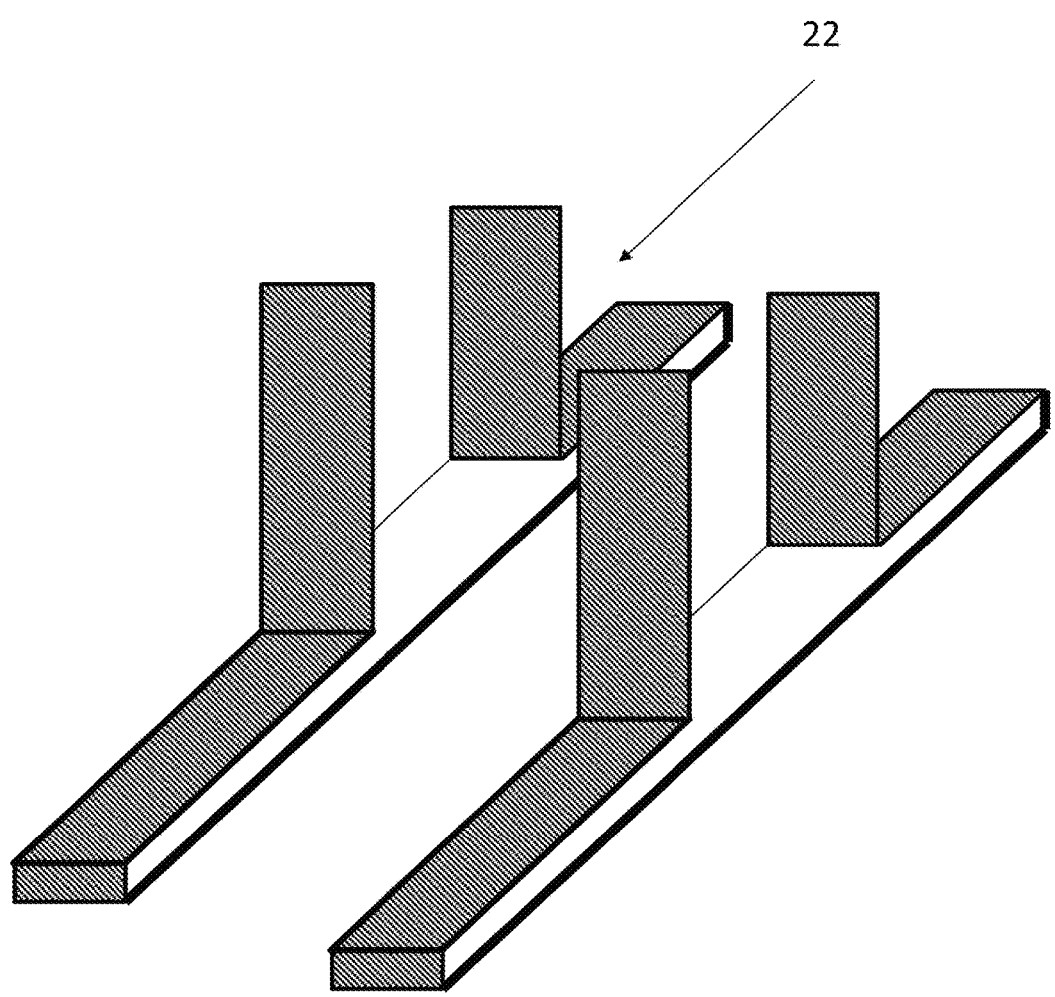
FIG. 8 is a view of an example of a base used to stabilize the invention on a table top.
Figure 9:
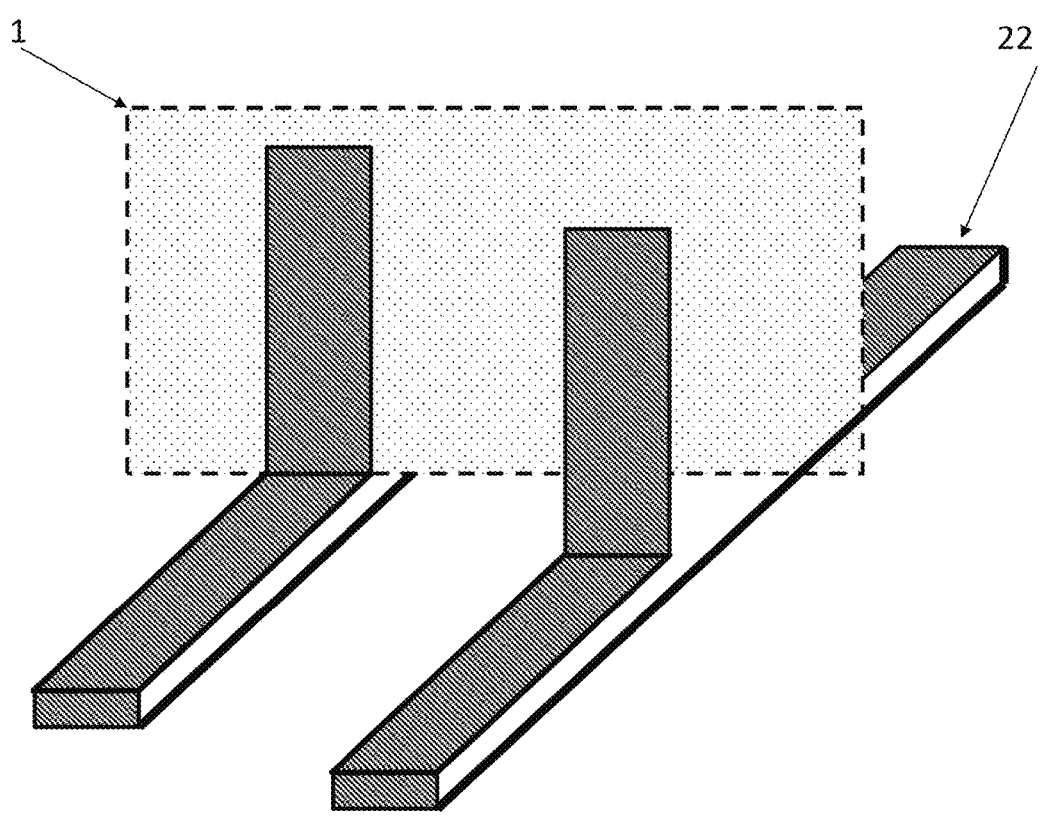
FIG. 9 is a view showing a diagram of how the invention would sit in the base.

Turning now to the drawings, FIGS. 1 through 4 illustrate one disclosed embodiment of the present invention. FIG. 5 illustrates a second embodiment of the invention displaying the additional feature of pockets for insertion of ice packets or other cooling elements. FIGS. 6 and 7 illustrate the third embodiment of the invention which illustrates it as a two part construction. FIG. 8 represents an example of means for stabilizing the invention on a surface or more particularly a base 22 to hold the lens shield on a surface. FIG. 9 is a diagrammatic representation of the invention as it would look in when stabilized by the said base 22. In the above figures the closing hook and loops are represented by hatches and cross hatches only in the open positions to emphasize their orientations. The hatches and cross hatches are omitted in the closed positions to avoid cluttering the drawings.

The lens shield assembly can be constructed from a number of materials but more particularly from heat resistant material belonging to both, natural or synthetic materials. Materials that can be used in the construction of the invention comprise but are not limited to heat resistant fabrics. Cotton fleece, some plastics, polycarbonate, polyester, fleece, flannel, metal, satin, silk, wool, linen, microfiber, vinyl, leather, velvet, suede, velour, burlap, hemp, synthetic fabrics, rubber, fiberglass insulation, mineral fibers such as fiberwool or rockwool, cellulose, and reflective materials.

Figure 2:
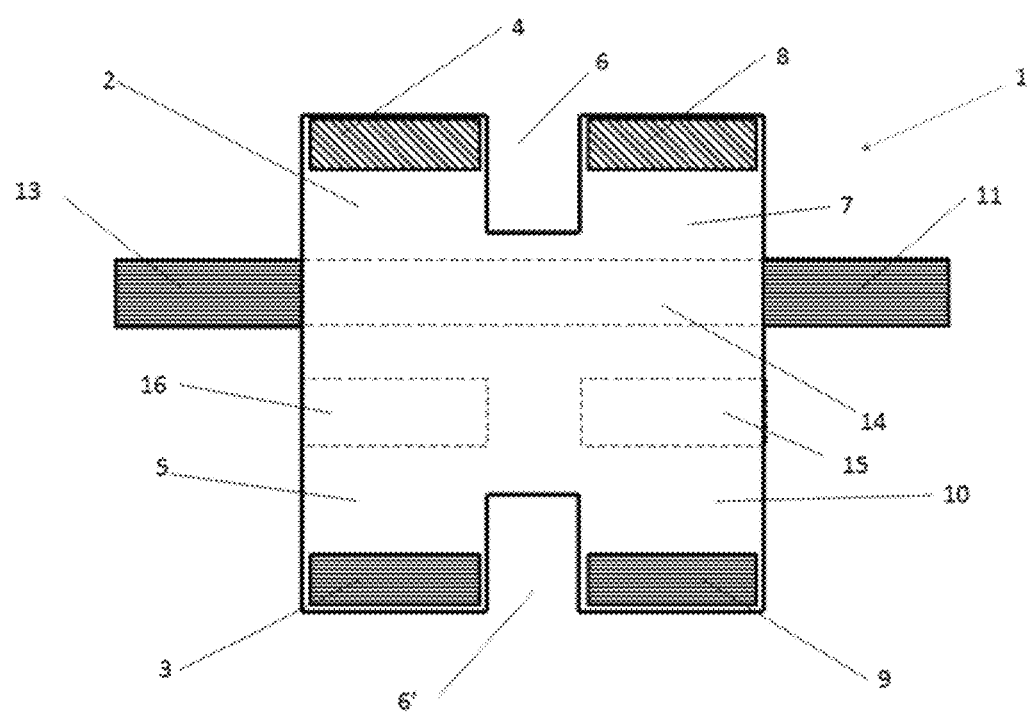
FIG. 2 is a plane view of the inside of the invention in an open position depicting the hook and loop closing strips.
Figure 3:
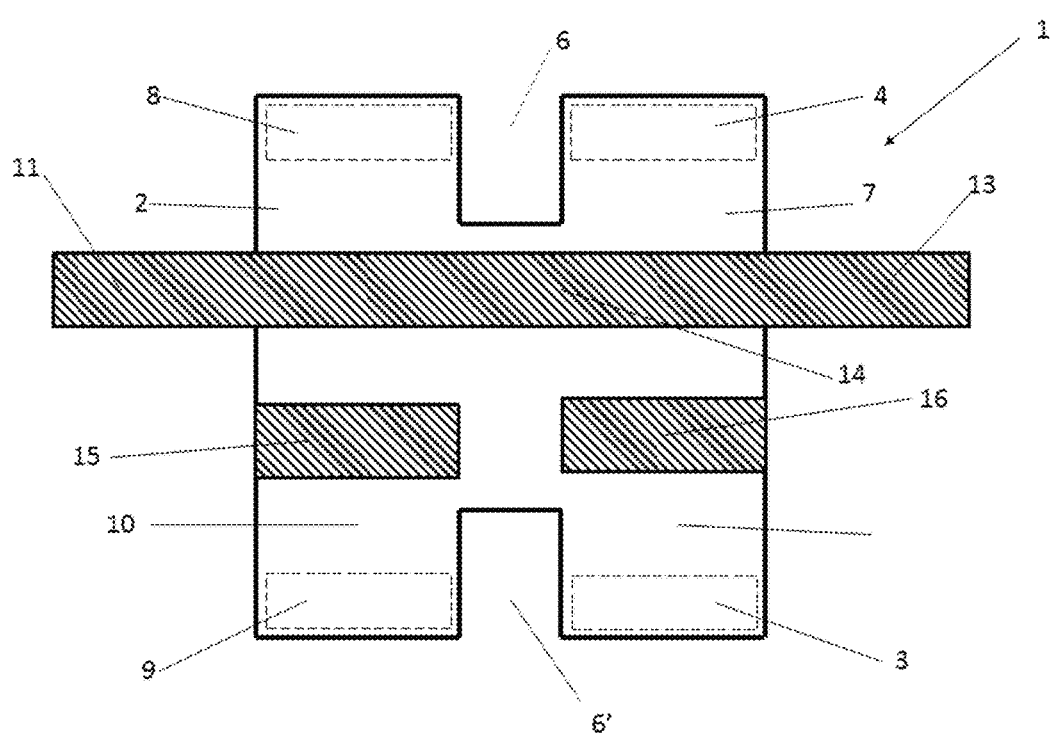
FIG. 3 is a plane view of the outside of the invention in an open position depicting the hook and loop closing strips.

In reference to FIG. 1, a lens shield assembly 1 is illustrated in a closed position using a hook and loop closure means, holding a pair of eye glasses in a manner preferred by the optician or laboratory technician and wherein the eyewear nose bridge 21 is exposed for adjustment by the optician. The explanation of the different components in this figure is better understood in the following description. FIG. 2 is a plane view of the inside of the invention in an open position depicting the different component of the invention. In reference to FIG. 2, the lens shield is constructed of a principal panel 1 in the shape of an H with notches 6 and 6' and subpanels 2, 5, 7 and 10. During the use of the invention subpanels 2, 5, 7 and 10 are in intimate contact with the lenses whereas the notches 6 and 6' leave the bridge of the glasses exposed for adjustment by the optician. The upper subpanels 2 and 7 display the loop closure strips 4 and 8 which are attached by suitable means. The strips 4 and 8 can be glued in or alternatively sewed in by thread. On the opposite side subpanels 5 and 10, are attached in a similar manner as described above, hook strips 3 and 9. When the lens shield 1 is folded on its middle in such a manner that subpanel 5 mates to subpanel 2 and subpanel 10 mates to subpanel 7, loop strip 4 (cross hatches) attaches reversibly to hook strip 3 (hatches) and loop strip 8 attaches reversibly to hook strip 9 FIG. 2 also displays extensions 11 and 13 that are part of the principal shield closure strip 14. The main body of the principal closure strip 14 is illustrated here with a dotted line since it is in the back of the current view. The surface of principal closure strip 14 facing the viewer in FIG. 2 is of a hook nature since it will mate to the closure loop strips 15 and 16 located in the back of the current view and shown in clearly in FIG. 3. The back surface of the principal closure strip 14 does not have to be either loop or hook. Often times these materials are double faced meaning that one face is hook while the other is loop as is the case in FIG. 3. Alternatively the principal closure strip can be of a loop nature as long as the strips 15 and 16 are of a hook nature. When lens shield 1 is folded on itself in the middle, extension 13 attaches reversibly to strip 16 and extension 11 attaches reversibly to strip 15. FIGS. 4 and 5 show the closed position of the lens shield as viewed from the back and front respectively. When the principal panel 1 is in its fully open position as described in FIG. 1 or 2, the overall principal panel 1 dimensions are preferably about 5 inches wide as measured from the outer edge of strip 8 to the outer edge of strip 4 by about 7 inches long as measured from the bottom edge of strip 9 to the top edge of strip 8. The thickness is depending on the materials used in the construction of the shield. One skilled in the art may vary these dimensions without departing from the scope of the invention.

In FIG. 5, the lens shield comprises pockets 19 and 20 having respectively insertion opening 17 and 18. In this embodiment pockets 19 and 20 are designed to house small squares of so called ice packets made for the most part of plastic structures containing a gel that freezes when disposed in a freezer. These ice packets when inserted in pockets 19 and 20 through insertion slots 17 and 18 provide extra cooling during the heating of the frames. In another embodiment of the invention electronic cooling devices such as a Peltier cooling device or any other cooling device can take the place of the ice packets.

Alternatively and as illustrated in FIGS. 6 and 7, the invention may be made of independent modules ML and MR each having their independent closure hook and loop mechanisms. In this embodiment, the two modules are identical and each has only two facing strips one hook and the other loop on the inside. Additionally, each of the modules ML and MR will have a principal strip PS made of a double faced hook and loop material that closes on a facing strip of opposite nature (hook or loop) when the module is folded on itself. When fully opened, each of these modules will have dimensions of about 2 inches wide by about 7 inches long. In a separate embodiment, independent modules ML and MR may further comprise pockets for insertion of ice packets or other cooling devices. There are instances when the invention may need stabilization on a surface. In these instances, means or bases for holding the lens shield such as the one represented in FIG. 8 can be provided. Different shapes or materials can be used to make these bases. A diagrammatic description of the manner in which these bases hold the lens shield is shown in FIG. 9.

Although the invention has been shown and described in detail with respect to some preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired. It is therefore, contemplated that the following claims will cover any such modifications or embodiments that fall within the true scope of the invention.

What is claimed is:

1. A lens shield consisting of:
    a. a principal panel in a shape of an H with an upper notch and a lower notch each said notches having a width of at least one inch,
    b. subpanels displaying loop and hook closure strips on each corner of the principal panel which are attached by suitable means such that when the lens shield is folded on a middle each hook strip attaches reversibly to an opposite loop strip while exposing a nose bridge of glasses through the notches,
    c. a principal closure strip having extensions, said extensions latch onto opposite strips on a back of the principal panel when the lens shield is folded on itself,
    d. external Pockets containing cooling devices.

2. The lens shield according to claim 1 wherein each cooling device is an ice packet.

3. The lens shield according to claim 1 wherein each cooling device is electrically powered.

4. The lens shield of claim 1 wherein the lens shield is manufactured from materials that are heat resistant.

5. The lens shield of claim 1 wherein the lens shield is manufactured from one or a combination of materials chosen from: Cotton fleece, polycarbonate, cotton, polyester, fleece, flannel, metal, satin, silk, wool, linen, microfiber, vinyl, leather, velvet, suede, velour, burlap, hemp, synthetic fabrics, rubber, fiberglass insulation, mineral fibers such as fiberwool or rockwool, cellulose, or reflective materials.

6. The lens shield of claim 1 wherein the principal panel is at least three inches wide by at least five inches long.

* * * * *